Figure 1:
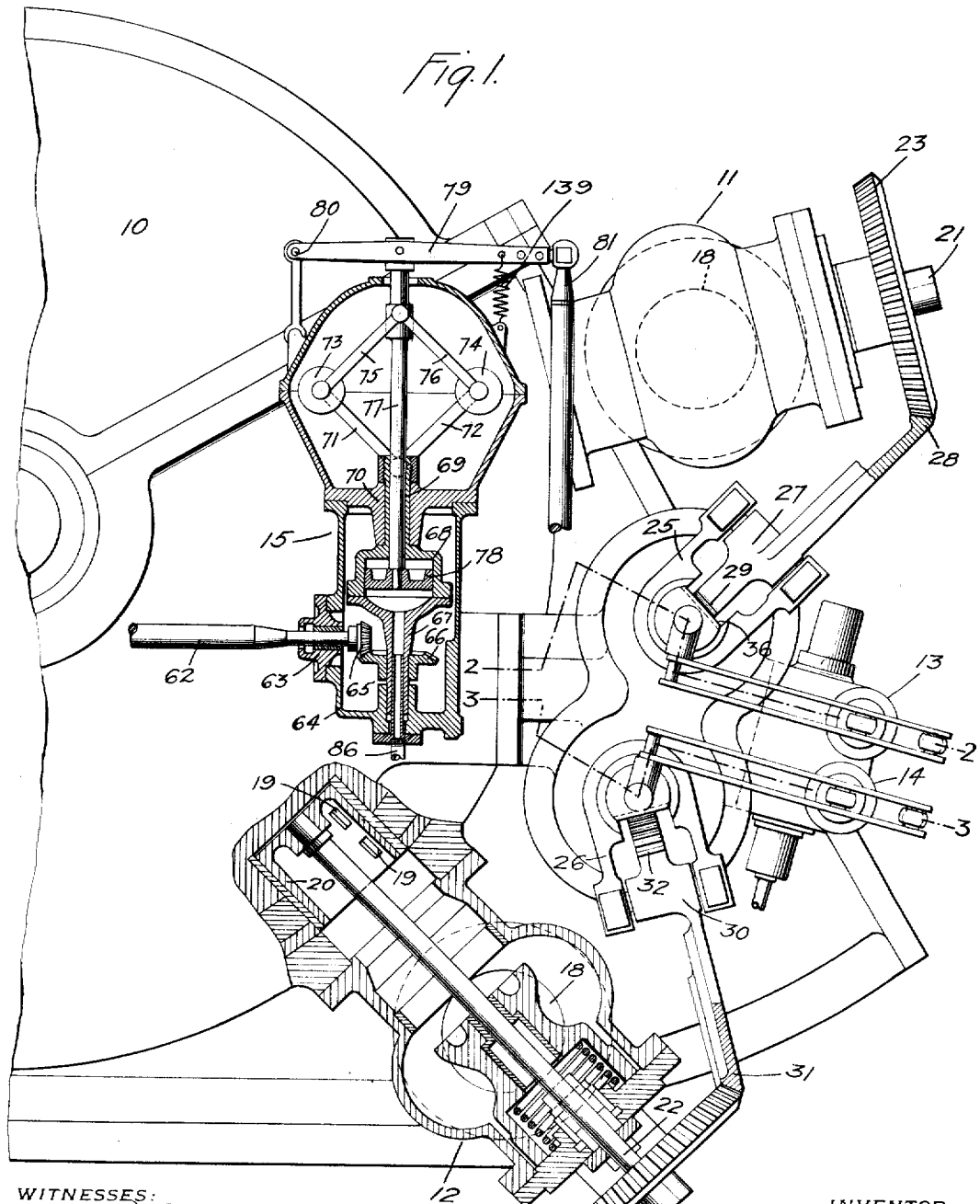

H. T. HERR.
MOTOR CONTROL.
APPLICATION FILED NOV. 25, 1910. RENEWED OCT. 9, 1913.

1,185,096.

Patented May 30, 1916.
4 SHEETS—SHEET 1.

WITNESSES:

INVENTOR.
Herbert T. Herr
BY
HIS ATTORNEY IN FACT.

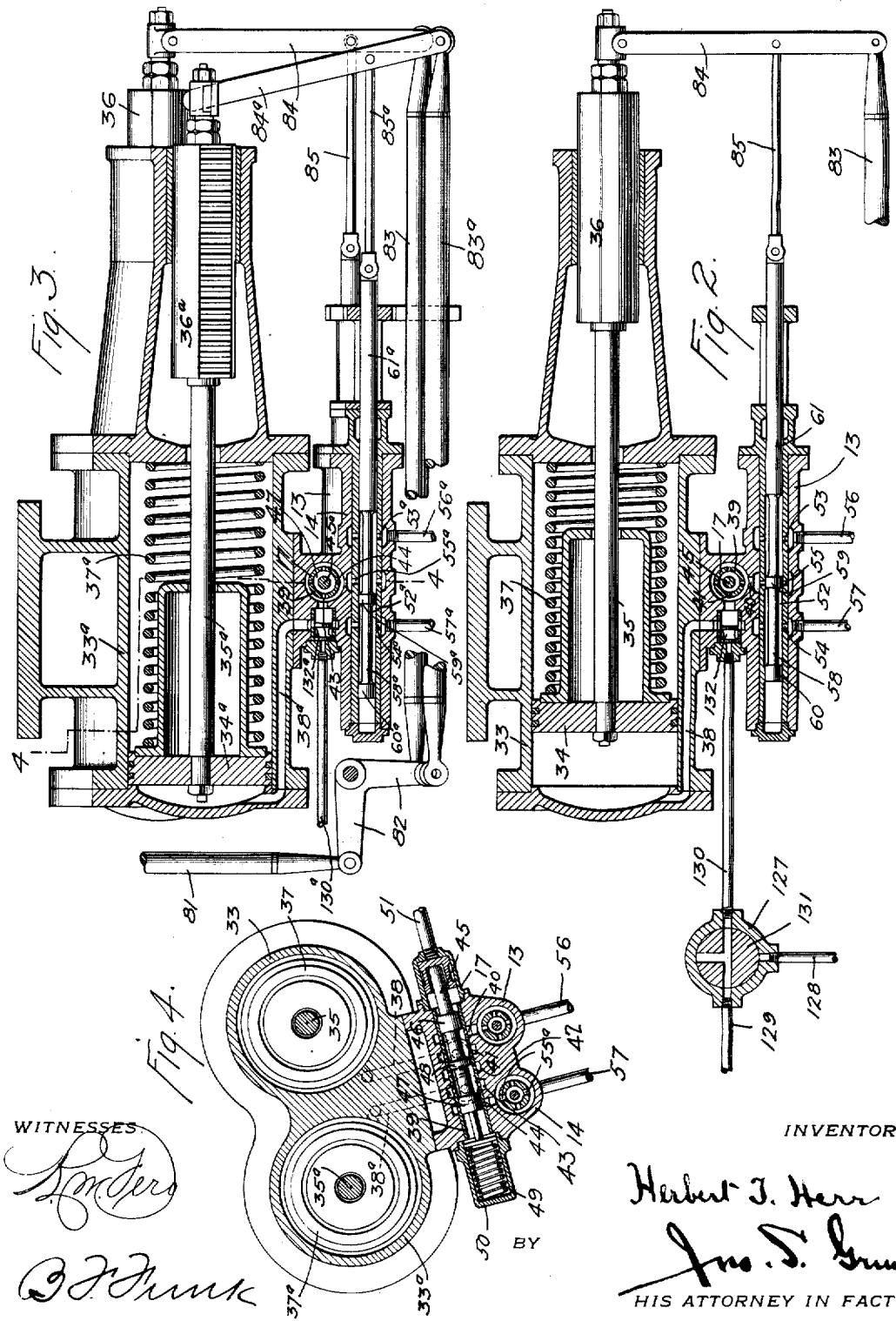

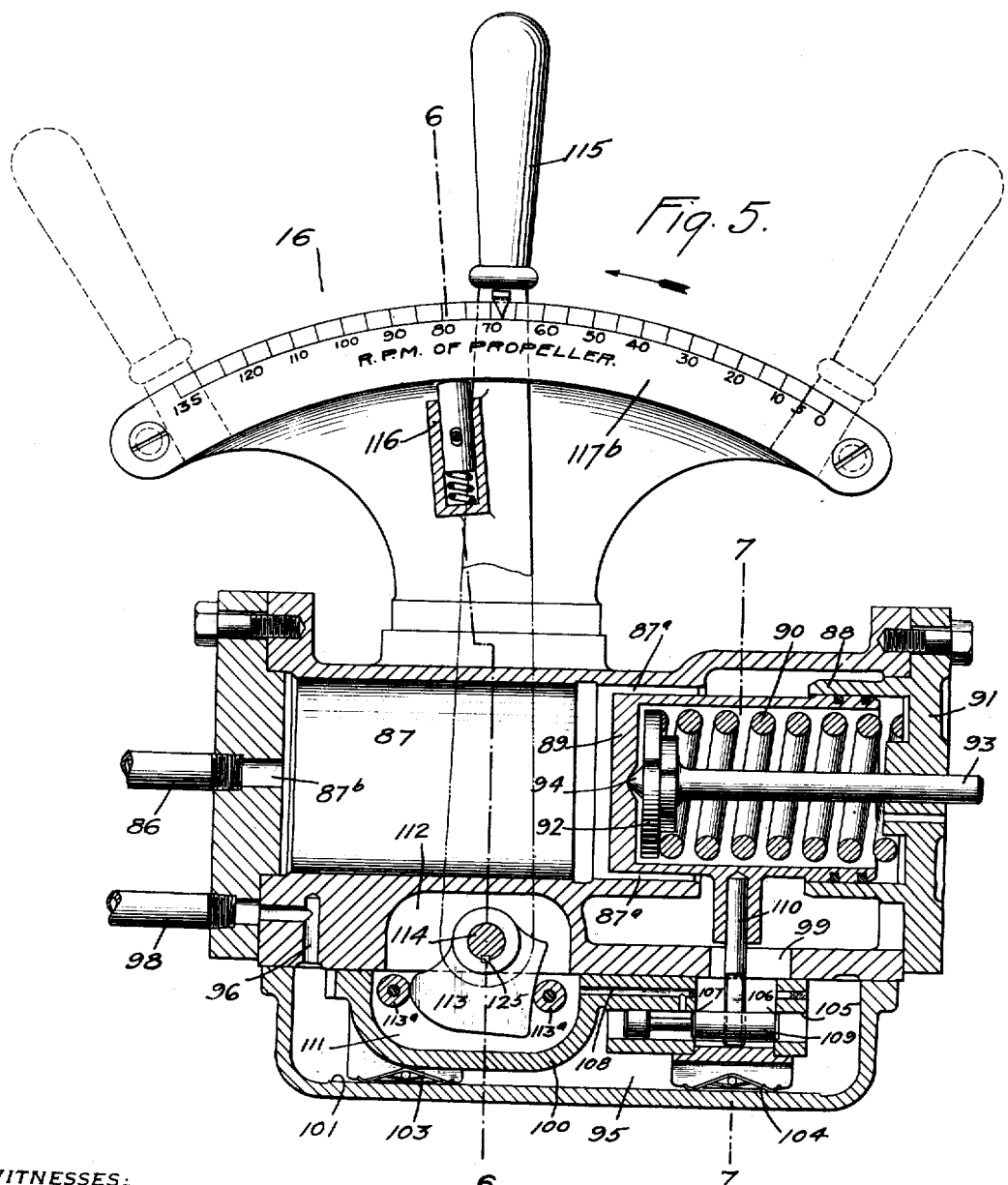

H. T. HERR.
MOTOR CONTROL.
APPLICATION FILED NOV. 25, 1910. RENEWED OCT. 9, 1913.
1,185,096.
Patented May 30, 1916.
4 SHEETS—SHEET 4.
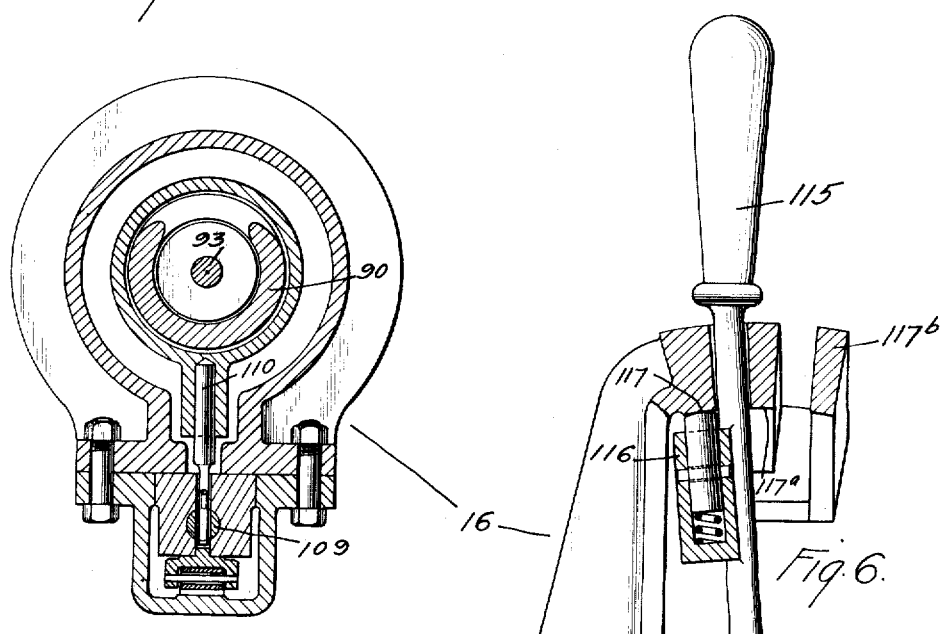
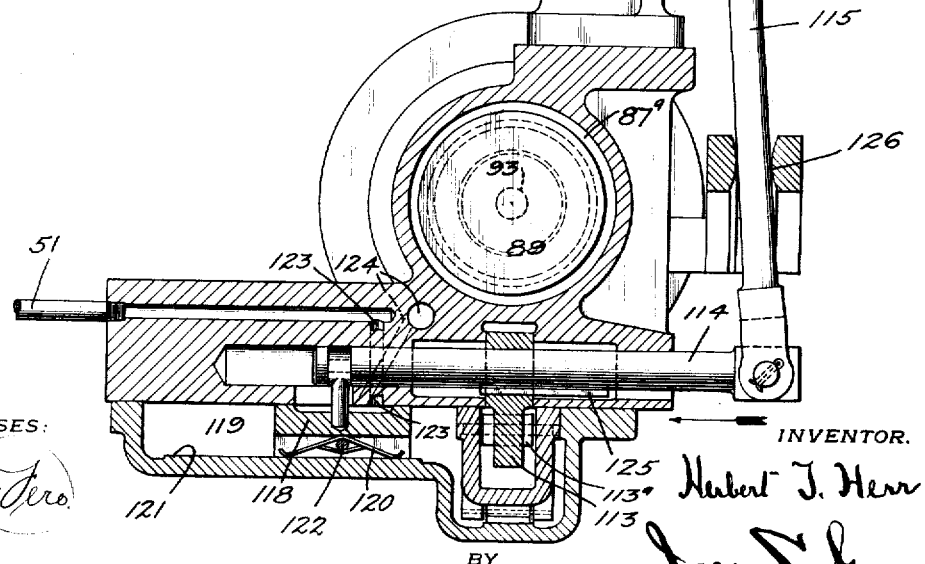

UNITED STATES PATENT OFFICE.

HERBERT T. HERR, OF PITTSBURGH, PENNSYLVANIA, ASSIGNOR, BY MESNE ASSIGNMENTS, TO THE WESTINGHOUSE MACHINE COMPANY, OF EAST PITTSBURGH, PENNSYLVANIA, A CORPORATION OF PENNSYLVANIA.

MOTOR CONTROL.

1,185,096.     Specification of Letters Patent.     Patented May 30, 1916.

Application filed November 25, 1910, Serial No. 594,067. Renewed October 9, 1913. Serial No. 794,326.

*To all whom it may concern:*

Be it known that I, HERBERT T. HERR, a citizen of the United States, and a resident of Pittsburgh, in the county of Allegheny and State of Pennsylvania, have made a new and useful Invention in Motor Control, of which the following is a specification.

This invention relates to motor control.

One of the objects of the invention is to provide means for controlling the direction of movement of the shaft driven by the impulse receiving element of the motor.

Another object of the invention is to provide means for controlling the speed at which the motor operates either in a forward or reverse direction.

Another object of the invention is to provide means whereby the direction of the rotation of the power shaft of the motor may be controlled from a point remote from the motor.

A further object is to provide means whereby the speed of a motor may be controlled from a point remote from the motor.

As an example of one application of my invention, it may be here stated that it is adapted for use in connection with rotary motors, such as turbines to be used on ship board, wherein the turbines are provided with an ahead stage and a reverse or astern stage.

Attention is called to the difficulty usually experienced in maintaining a given speed in fleet or squadron formation in the navy. With a device embodying the essential features of my invention, embodiments of which are illustrated in the accompanying drawings, any desired speed may be maintained by a ship in which an embodiment of my invention is installed; and, moreover, the speed may be varied at the will of the operator from the bridge of the vessel; furthermore the speed may be instantaneously changed from the lowest to the highest speed (having regard for the period of time ordinarily required for acceleration) or the vessel can be quickly slowed down, or any variation of speed between the highest and lowest can be readily accomplished by increasing or decreasing the resistance offered to the centrifugal force of the weights for the speed responsive device ordinarily known as the speed governor. Likewise the direction of travel of the ship (that is ahead or astern) may be controlled from the bridge by suitable mechanism to be described hereinafter so that the navigator or quartermaster may have absolute control of the speed and direction of movement of the ship installed with a device embodying the generic features forming a part of my invention.

In the drawings: Figure 1 is an end view of a turbine showing a speed responsive device and one of the inlet valves in section, the remaining portions being shown in elevation; Fig. 2 is a sectional view on the line 2—2 of Fig. 1; Fig. 3 is a sectional view on the line 3—3 of Fig. 1; Fig. 4 is a sectional view on the line 4—4 of Fig. 3; Fig. 5 is a longitudinal sectional view through the controlling mechanism; Fig. 6 is a sectional view on the line 6—6 of Fig. 5; Fig. 7 is a sectional view on the line 7—7 of Fig. 5.

In carrying out my invention I may employ a motor, such for example, as a turbine 10 having two inlets, the one designated 11 being the ahead stage inlet and the one designated 12 being the astern stage inlet. The valves for controlling the inlets are shown as controlled by suitable oil relays, there being an oil relay 13 for the valve controlling the inlet 11 and an oil relay 14 for the valve controlling the inlet 12. The oil relays are controlled by a suitable speed responsive device 15, which may be loaded for any definite speed between two extremes by a controller 16 illustrated in Figs. 5, 6 and 7. The controller 16 also controls the operation of an oil relay governing valve hereinafter called a reversing valve and designated by the reference numeral 17 of Fig. 4. The valve mechanisms for both the ahead and the astern stages of the turbine are substantially alike, so it is deemed necessary only to describe one of them.

By reference to Fig. 1 it will be observed that the inlet for each stage is provided with a valve casing having an inlet 18 and an outlet or outlet ports 19. The ports 19 may be covered and uncovered by a rotating valve 20 located within the casing and provided with suitable port cuttings so that the extent of rotation of the valve 20 will determine the effective port area through which fluid may pass into the turbine. So much of the valve mechanism as has just been described is common to both inlets 11 and 12. For the sake of clearness, however, I have designated the valve stem for the ahead stage as 21 and the valve stem for the astern stage as 22. These stems may pass through suitable packed bushings or glands in their respective casings. The valve stem 21 is provided with an operating gear 23, while the valve stem 22 is provided with a similar gear 24. In suitable brackets 25 and 26 are rocking levers or segments. In the accompanying drawings, I have shown two of these, one for the gear 23 and the other for the gear 24; the one for the gear 23 consists of a lever 27 pivoted intermediate its ends on the bracket 25 and having at one end a gear segment 28, which meshes with the gear 23. The other end of the lever is provided with a segment gear 29 which meshes with a rack formed or mounted on a piston rod of an oil relay to be described hereinafter. The other lever 30 is pivoted on the bracket 26 and is provided with a gear segment 31 which meshes with the gear 24; the other end of the lever 30 is provided with a gear segment 32, which meshes with a rack formed or mounted on a piston rod in an oil relay to be described hereinafter.

I shall now proceed to describe the oil relay or actuating device 13 for the valve controlling the ahead inlet 11. By reference to Fig. 2 it will be observed that the relay or actuating device, which may be termed a valve actuating motor, may consist of a cylinder 33 provided with a reciprocatory piston 34; the piston 34 is provided with a rod 35, which extends through one end of the cylinder 33 and carries a rack 36, which meshes with the toothed segment 28 of the lever 27. An expansion spring 37 bears against one end of the cylinder and against one end of the piston so as to have a tendency to move the piston in a direction away from the end of the cylinder nearest the rack 36. Means are provided for delivering fluid or liquid under pressure to the cylinder 33, so that the piston 34 is moved in response to the pressure of the liquid or fluid in opposition to the pressure of the spring 37. This moves the rack 36, which engages the gear 23 on the stem of the valve 20, serving the inlet 11 to the ahead stage of the turbine, and rotates the valve to increase its port opening and the delivery of motive fluid to the ahead stage of the turbine.

It might be stated to advantage here that the relay for the ahead stage valve mechanism is independent of the relay for the astern stage valve mechanism, although both relays are constructed and operate in substantially the same manner. In order to distinguish like mechanism in the astern stage valve operating relay from those of the ahead stage valve operating relay, I have used the same reference numerals on the relay 14 as are employed to designate corresponding parts on the relay 13, but I have added the exponent "a" to each reference numeral applied to the relay 14; for example, the part on the relay 14 corresponding to the part 33 on the relay 13 will be designated 33$^a$; the part corresponding to the part 34 of the relay 13 will be designated on the relay 14, 34$^a$ and so on.

Communicating with passages 38 and 38$^a$ of the respective relay cylinders is the casing of the reversing valve 17, see Fig. 4. The casing for the reversing valve 17 is provided with a plurality of ports communicating with the cylinders of the relays 13 and 14 with valve casings for controlling valves and the exhaust ports.

In Fig. 4 I have shown a valve in the casing as being in position to admit oil or fluid into the ahead cylinder 33 of the relay, and in Fig. 2 I have shown the admission valve in proper position to admit oil into the cylinder of the relay 13. 39 is a bushing within the reversing valve casings 17. This bushing is shown as provided with ports 40, 41, 42, 43 and 44. Within the bushing 39 is a valve stem 45 carrying piston valves 46 and 47, interposed between which is a partition or collar 48. If the piston 34 is to be moved against the spring 37, fluid under pressure will be admitted into the port 40 around the stem 45 out through the port 41 into the passage 38 and against one end of the piston 34; this will be possible by having the valves on the valve stem 45 in the positions shown in Fig. 4 so that the inlet port 44 will be closed by the valve 47, the inlet port 40 will be uncovered by the valve 46 and the cylinder 33$^a$ will be placed in communication with the exhaust port 42. The position of the valve stem 45 and its valves, as shown in Fig. 4, is the normal position due to the force exerted by a spring 49, one end of which bears against a cap or housing 50 and the other end of which bears against one end of the stem 45. If it is desired to cut off communication between the port 40 and the inlet passage 38 of the cylinder 33, this can be accomplished by causing pressure to preponderate at the end of the stem 45 distant from the spring 49 so as to overcome the pressure exerted by the spring to the extent that the valve 46 will move longitudinally to close the port 40, displacing the valve 47 from its normal position to uncover the port 44 and cut off the supply of fluid from the cylinder 33, but admit it to the astern cylinder 33$^a$. With the valve stem 45 in this position the collar 48 is shifted past the discharge port 42 and consequently places the cylinder 33 in communication with the port 42 and closes communication between that port and the cylinder 33. The means for admitting fluid pressure to act against the end of the stem 45 through a pipe 51 will be more fully explained hereinafter.

Communicating with the inlet port 40 is a cylinder 52 of a pilot valve; this cylinder is provided with ports 53, 54 and 55. The port 53 communicates with a pipe 56 in communication with a suitable source of fluid, as for example, oil under pressure. The port 54 communicates with an exhaust pipe 57 and the port 55 communicates with the port 40. Within the cylinder 52 is a reciprocatory valve stem 58, which carries a valve 59 adapted to cover and uncover the port 55, the stem being of less diameter than the diameter of the cylinder 52 and having at its respective ends heads 60 and 61. A similar construction of pilot valve and ports is provided for the astern relay as shown in Fig. 3, so I have designated parts on Fig. 3 corresponding to parts on Fig. 2 by the same reference numerals plus the exponent "a", as heretofore explained.

By reference to Fig. 2, it will be observed that if oil is admitted through the pipe 56 into the cylinder 52 and the port 55 is uncovered by the valve 59, the oil will pass into the reversing valve 17; and in the event that pressure from the pipe 51 is not sufficient to overcome the force of the spring 49, the oil will pass through the port 40 through the port 41 and into the port 38 so as to actuate the piston 34. If, however, pressure from the pipe 51 preponderates over the pressure exerted by the spring 49, the valve 46 will close the port 40 and the valve 47 will be moved to open the port 44; therefore oil may pass from the pipe 56ª into the cylinder 52ª out through the port 55ª through the port 44 through the port 33 into the passage 38ª, and move the piston 34ª against the action of the spring 37ª and actuate the reverse or astern stage valve, while the ahead valve mechanism would be ineffective, to admit steam to the cylinder of the turbine.

The pilot valves are controlled by a speed responsive device here illustrated as a governor 15 and through a plurality of links and levers, the positions of the pilot valves are such that a proper pressure will be admitted against the piston in order to operate the ahead or the astern valve operating relay, whereby the port area to the proper stage of the turbine will be such as to admit steam for the determined speed.

By reference to Fig. 1, it will be observed that a lay shaft 62 receiving motion from the motor shaft in the usual way is journaled in the bearing 63 in the governor casing 64. On the end of the shaft 62 is a gear 65 which meshes with a gear 66 on the restricted end 67 of the cylinder 68; the cylinder 68 carries a shaft 69 in bearings 70 to which are secured links 71 and 72 for the governor weights 73 and 74. Links 75 and 76 are connected to the weights 73 and 74 and to the spindle 77 carrying a piston 78 in the cylinder 68 and projecting through the hollow shaft 69. The governor spindle extends beyond the end of the casing and is connected to a lever 79 fulcrumed at 80 and carrying at its opposite end a link 81, which is connected to a bell-crank 82, having one end fastened to links 83 and 83ª. The link 83 is connected to one end of a floating lever 84, the other end of said lever being connected to the piston rod 35 of the piston 34. The link 83ª is connected to one end of a floating lever 84ª, the opposite end of the lever being connected to the piston rod 35ª of the piston 34ª. A link 85 is connected to the pilot valve stem 61 and to the lever 84. A similar link 85ª is connected to the pilot valve stem 61ª and to the lever 84ª.

It will be apparent that if fluid pressure is admitted into the cylinder 68 through the pipe 86 and the restricted portion 67 of the cylinder, that the piston 78 will be raised so as to hold the governor weights 73 and 74 as effectually as could be accomplished by a spring and that this holding of the governor weights may be accomplished from a point distant from the motor, as for example, from the bridge of a ship. At the same time that the governor weights 73 and 74 are loaded the longitudinal motion imparted to the spindle 77 will impart movement to the link 81 and through the links 83 and 83ª to the pilot valves so as to cause them to open their inlet ports and admit fluid into the valve casing 17. It is to be remembered now that where no pressure is exerted to counter-balance the action of the spring 49 that the valves will be in the position shown in Fig. 4 and fluid will be admitted into the ahead cylinder 13 of the valve actuating mechanism. As this fluid is admitted, obviously the piston 34 will move against the action of the spring 37 and open the inlet valve for the ahead stage of the turbine an amount determined by the position of the piston 34; and the position of the piston 34 in the cylinder 33 is determined by the length of time the inlet port 55 is opened.

It should be here stated that when pressure is admitted against the governor piston 78, a downward pull will be exerted on the pilot valves so as to uncover the inlet ports 55 and 55ª; but as soon as pressure is admitted into the cylinder 33, the movement of the piston will impart a movement to the lever 84 carrying with it the pilot valve stem 61 to close the port 55, as shown in Fig. 2. The duration of time that the port 55 is open will therefore be determined by the amount of pressure exerted against the piston 78, because the extent of movement of the piston 78 due to a determined pressure will determine the amplitude of movement of the link 81 and consequently the amplitude of movement of the pilot valve. For example if the pilot valve is barely moved off its seat, a slight movement of the piston 34 will cause it to be reseated; but if maximum pressure is exerted against the piston 78, the movement of the pilot valve will be proportionally great and a proportionately greater movement of the piston 34 must take place to re-seat the valve 59. It will be apparent that if the motor is in a state of rest by simply applying pressure against the piston 78, the inlet valve to the turbine will be open through the relay and the motor will be started up. If the speed of the motor becomes excessive, a movement will be imparted to the piston 78 by the centrifugal action of the weights 73 and 74 against the pressure in the cylinder 68 and a movement will be imparted to the link 81 in a direction opposite to that just described. In this event, the pilot valve will be unseated not to admit pressure against the piston 34, but to relieve it, that is to permit the pressure to exhaust through the pipe 57 causing the pressure of the spring 37 to preponderate to the extent that the piston 34 will be moved against the fluid pressure, and the inlet valve to the turbine stage will be closed, or partially closed, depending of course upon the movement of the piston 34.

In Fig. 3, I have illustrated the relative positions of the links, pilot valves and their appurtenances that they would assume if the turbine was in operation with the astern inlet valve closed and the ahead inlet valve open. In such a case both the links 83 and 83ª will have the same length of stroke imparted to them by the governor spindle 77; but the relative positions of the pilot valves will be different with respect to their respective ports; while the movement of the astern operating valve relay will be such as to admit pressure to its cylinder, the port 44 from the astern pilot valve is closed by the valve 47.

I have heretofore referred to certain fluid controlling means for imparting movement to the piston 78 and for moving the valve stem 45 against the action of the spring 49. One form of the controlling mechanism is best illustrated in Figs. 5, 6 and 7. I will now proceed to describe it in detail and the manner in which it is associated with the remaining parts of the device.

The form of controller herein shown consists of a chamber 87 provided with an inlet 87ª and an outlet 87ᵇ communicating with a pipe 86 which admits air into the cylinder 68 of the speed responsive device. At one end of the cylinder 87 is a piston guide 88 to receive a longitudinal movable piston 89 normally extended in one direction by means of a spring 90, one end of which bears against a spring seat at the end 91 of the cylinder 87 and the other end of which bears against a disk 92 on the end of the piston rod 93, which may extend through the end 91 of the cylinder 87 to be guided thereby; the disk 92 having a lug or projection 94 to provide a point contact with the inner face of the piston 89. By reference to Fig. 5 it will be observed that in the form shown, the inlet 87ª is annular, that is it is provided by the inner wall of the cylinder 87 and the exterior of the piston 89. Adjacent to the cylinder 87 is an air chest 95 having an inlet port 96 communicating with a suitable source of supply, as for example a reservoir through the pipe 98. The outlet or exhaust for the air chest 95 is shown at 99 so that air passing into the chest through the port 96 may pass through the port 99 into the cylinder 87.

In order to control the delivery of air through the port 99 and thereby control the pressure within the cylinder 87, I have provided a slide valve designated by the reference numeral 100; this slide valve 100 is shown as consisting of an elongated body portion slidable upon the floor 101 of the air chest 95 and held against its seat 102 by means of springs 103 and 104 and also by means of the pressure within the chest. The valve 100 has within it, ports 105, 106, 107 and 108. The ports 105 and 107 are normally closed or approximately closed by the piston valve 109 connected to the piston 89 by a finger 110. The slide valve 100 is provided with a pocket or recess 111, which approximately coincides with a similar one 112 here shown as being formed in the wall of the cylinder 87 and these two recesses receive a finger illustrated as a cam 113 on the shaft 114 extending through the wall of the cylinder 87 and moving against the rollers 113ª. On the shaft 114 is a controller lever 115 carrying a friction dog 116 to frictionally engage one of two segments 117 and 117ª; the segment 117ª in conjunction with the segment 117 forms a slot in which the lever 115 may move back and forth while the segment 117ª in connection with the segmental bar 117ᵇ forms another slot into which the lever 115 may be moved through a selective notch in a manner common to selective gear levers. The segment 117ᵇ, or either of the other two, may be provided with suitable gradations or a scale whereby the lever 115 may be moved to the proper position with respect to the segment to insure proper increments of the speed of the motor carrying the speed responsive device or so that suitable pressure may be maintained in the cylinder 87. The finger 113 need not necessarily be a cam, but when the control is employed in conjunction with a speed responsive device, I find it desirable to employ a cam of the contour illustrated because the pressure from the pipe 86 into the cylinder 68 of the speed responsive device will vary directly as the pressure in the cylinder 87 and the resistance opposed to the weight carried by the piston or spindle 77, and the pressure under it will be proportional to the square of the speeds of the weights, so the movement of the valve 100 must be proportionately increased for progressive increased increments of speed of the governor or speed responsive device. In other words the progressive movements of the handle 115 may give any desired variation in speed of the governor apparatus.

In the apparatus illustrated the segment 117ᵇ is so graduated that the scale indicates the revolutions per minute of the machine or engine connected to the governor and the operating faces of the cam are constructed accordingly, that is so that equal increments of motion of the handle 115 along the scale will cause equal variations in the speed of the governed apparatus. It will be apparent from this that the cam is employed merely because its operating faces can be easily constructed to produce the required motion of the valve 100.

By reference to Fig. 6 it will be observed that in addition to the control mechanism for the speed responsive device, I have associated with the said mechanism means for applying pressure to the pipe 51; this means consists of a valve 118 which presses against its seat 119 by a spring 120 bearing against the floor 121 of the air chest 95. The valve 118 is provided with a pin 122 which is fast on the shaft 114. Within the casting forming a part of the cylinder 87 is an outlet port 123 normally closed by the valve 118 and adjacent to the outlet port 123 is an exhaust port 124 which communicates with an opening in the valve seat 119 and exhaust to atmosphere. The shaft 114 engages the cam 113 by a key or sliding connection, the key being illustrated at 125, Fig. 6. The lever 115 is fulcrumed at 126. From the construction just described, it follows then that if the lever is moved in a forward or rearward direction, the cam 113 will be operated as above enumerated so that a proper amount of pressure will be admitted to the cylinder of the governor and this will be true whether the lever 115 is in the slot formed by the segments 117 and 117ᵃ or whether it is in the slot formed by the segments 117ᵃ and 117ᵇ. As heretofore stated, the lever may readily be moved into either slot through a selective notch in the segment 117ᵃ. If the lever is in the slot formed by the segments 117 and 117ᵃ, as for example, in the position shown in Fig. 6, it can be moved in said slot to control the speed responsive device only. If, however, it is moved on the fulcrum 126 so that it will pass through the selective notch into the slot formed by the segment 117ᵃ and 117ᵇ, the shaft 114 will be moved in the direction of the arrow, Fig. 6, so as to carry the valve 118 past the port 123 and admit pressure from the air chest through the port 123 and out through the pipe 51, which communicates with the casing of the reversing valve. In such a position, the pressure from the controlling device, or more properly speaking from the pressure chest of the controlling device, will actuate the valve stem 45 against the action of the spring 49 and render the oil relay for the ahead stage valve operating mechanism ineffective, but will render the oil relay for the astern stage valve operating mechanism effective.

It may possibly happen that the pressure in the main reservoir would fail or from some cause the pipes leading to the relays might become broken; to avoid difficulty under such conditions, I have provided an emergency valve illustrated for each oil relay illustrated in Fig. 2. Prior to operating the emergency valve both oil relay pilot valves will be in exhaust position because the governor or speed responsive device will be devoid of pressure under its piston and when the pilot valves are so positioned, the emergency valve may be operated. The valve is shown in Fig. 2 as comprising a casing 127 having ports 128, 129 and 130 and a three-way valve 131 is provided in the casing to admit pressure from a suitable source in communication with the pipe 128 through the pipe 130 to the port 38 or to exhaust pressure from the port 38 back through the pipe 130 and out through the exhaust 129. When the emergency valve 131 is not being used the communication between the pipe 130 and the port 38, it is closed by a check valve 132. When the pressure is being admitted through the emergency valve the check valve 132 will close communication between the port 38 and the reversing valve or between the port 38ᵃ and reversing valve as the case may be. I have shown an emergency valve as being connected to the ahead stage relay, but it is obvious that a separate emergency valve may be provided for the astern stage relay, or a single multi-ported valve may be employed whereby both relays may be controlled from one controller.

Assuming all the parts are properly assembled and that the necessary pipes to receive pressure are provided with suitable sources of supply, and suppose it is desired to start the motor, the operator on the bridge or at any other convenient point distant from the motor (if distant control is desirable) may grasp the handle 115, and by moving it in the direction indicated by the arrow in Fig. 5, admit pressure to the cylinder 68. By so doing the rod or stem 77 will be moved longitudinally to impart movement to the link 81 and through the mechanism connected to it cause the valve 59 to uncover the port 55 and admit pressure through the reversing valve into the cylinder 33 so as to impart movement to the piston 34. The longitudinal movement of the piston 34 due to the pressure through the relays will cause a movement of the segment 27 resulting in a rotative movement being imparted to the valve on the shaft 21, and the movement of pressure admitted to the cylinder 68 will determine the amount of effective port area through which steam may pass into the ahead stage of the turbine. The turbine will then start and the speed responsive device will be effective in controlling the speed, which will be determined by the position of the handle of the lever 115 with respect to the scale on the segment 117$^b$.

If the piston 78 was unrestricted in its movement when air was admitted to the cylinder 68, it might happen that the admission valves to the turbine would be actuated too suddenly inasmuch as the slightest amount of air in the cylinder 68 would initially move the piston 78 along the entire length of the cylinder 68 so as to open the pilot valves for the oil relays to their fullest extent and these valves would not move back until the speed responsive device started to operate due to the operation of the turbine. In order to prevent the full opening movement of the pilot valve for the oil relays, I have provided a spring 139 connected to the lever 79 and to the casing of the speed responsive device whereby when pressure is admitted to the cylinder 68, the movement of the piston 78 will be opposed by said spring and a gradual opening movement of the pilot valves for the oil relays and consequently a gradual opening movement of the admission valve for the turbine will take place.

If it is desired to change the speed of the motor, this can be accomplished by moving the lever in either one direction or the other dependent upon whether the speed is to be accelerated or reduced. Suppose it is desired to reverse the motor, the operator may grasp the handle of the lever 115 and by relieving pressure from the cylinder 68, the piston 78 will move longitudinally so as to permit fluid from the cylinder 33 to exhaust and permit the spring 37 to actuate the piston 34 and close the inlet valve to the ahead stage of the turbine. The lever 115 may then be moved over into the slot formed by the segments 117$^a$ and 117$^b$, which will result in moving the valve 118 so as to open communication with the port 123 and move the piston carrying stem 45 against the spring 49 closing off communication between the pilot valve for the ahead stage relay and the reversing valve and opening communication between the astern relay pilot valve and the reversing valve so that pressure may enter the port 38$^a$ and actuate the piston 34$^a$ to open the astern stage valve whereby the motor will be reversed.

In order to convey a comprehensive idea of the generic principles of my invention I have specifically described various details of construction which will be effective in carrying it out, but I do not desire to limit myself to the specific form shown, nor to the minor details of construction embodied in the illustration, it being obvious that changes in form, proportion and minor details of construction may be resorted to without departing from the spirit of the invention or sacrificing any of its advantages.

Having thus described my invention, what I claim is:

1. The combination with a motor, an inlet valve for the motor, a speed responsive device, a relay connected to the speed responsive device and valve and means distant from the motor to load said speed responsive device to determine the amplitude of movement of the inlet valve.

2. The combination with a motor, an inlet valve for said motor, a speed responsive device, an inlet valve connected to said speed responsive device and means distant from the motor to load said speed responsive device against the action of the governor weights.

3. The combination with a motor, an inlet valve for the motor, a speed responsive device controlling said valve fluid pressure controlling means for loading the speed responsive device, and manually adjustable means for controlling said controlling means.

4. The combination with a motor, an inlet valve for the motor, a relay connected to the valve, a speed responsive device for operating the relay and a hand actuated fluid pressure device for loading the speed responsive device.

5. The combination with a motor, a speed responsive device, a valve controlled by the speed responsive device and a hand operated fluid controlling mechanism for loading the speed responsive device.

6. A turbine having an ahead stage and an astern stage, valves for the inlets for the respective stages, a speed responsive device for controlling the opening and closing movement of said valves and means distant from the motor for variably holding the governor spindle to counteract the effect of the centrifugal force of the governor weights.

7. A turbine having an ahead and an astern stage, separate valves for admitting motive fluid to the respective stages, a speed responsive device for controlling the extent of opening movement of said valves, means for variably holding said speed responsive device and means distant from the motor for determining which of said valves shall have an opening movement imparted to it by the speed responsive device.

8. A turbine having an ahead and an astern stage, separate valves for admitting motive fluid to the respective stages, a speed responsive device for controlling the extent of opening movement of said valves, means for variably holding said speed responsive device and manually controlled means distant from the motor for determining which of said valves shall have an opening movement imparted to it by the speed responsive device.

9. A turbine having an ahead and an astern stage, separate valves for admitting motive fluid to the respective stages, a speed responsive device for controlling the extent of opening movement of said valves, means for variably holding said speed responsive device and fluid pressure controlling means distant from the motor for determining which of said valves shall have an opening movement imparted to it by the speed responsive device.

10. An apparatus of the character described, comprising a motor, means for delivering motive fluid thereto, a relay for controlling the operation of said means, a speed responsive device for controlling the operation of said relay, and regulable pressure actuated means for controlling the operation of said speed responsive device, to vary the speed of the motor.

11. An apparatus of the character described, comprising a motor, means for delivering actuating fluid thereto, a relay for controlling the operation of said means, a speed responsive device for controlling the operation of the relay, pressure actuated means for controlling the effective operation of said device, and means located at a distance from the motor for controlling the operation of said pressure actuated means.

12. An apparatus of the character described, comprising a motor, means for delivering actuating fluid thereto, a speed responsive device controlling the operation of said means, pressure actuated means for controlling the operation of said device, and means located at a distance from the motor for varying the actuating pressure of said means.

13. An apparatus of the character described, comprising a motor, means for delivering actuating fluid to the motor, a governor for controlling the operation of said means, fluid pressure actuated means for varying the operation of said governor, and a controller for delivering regulable fluid pressure to said pressure actuated means.

14. An apparatus of the character described, comprising a fluid actuated mechanism, means for delivering actuating fluid to said mechanism, a speed responsive governor for controlling the operation of said means, pressure actuated means for varying the effective operation of the governor in response to defined speeds, and a controller for delivering regulable pressures to said pressure actuated means.

15. In combination, a fluid impelled motor having separate fluid delivery valves, separate actuating means for said valves, a governor for controlling the operation of said separate actuating means, a controller located at a distance from the motor for varying the effective operation of the governor, and means for rendering one or another of said valve actuating means inoperative.

16. An apparatus of the character described, comprising a fluid delivery means and an actuating mechanism therefor, a governor for controlling the operation of said mechanism, fluid pressure actuated means for controlling the effective operation of said governor and a remote controller for regulating the actuating pressure of said governor controlling means and for rendering said actuating mechanism operative or inoperative.

17. An apparatus of the character described, comprising a fluid delivery means, an actuating mechanism therefor, a governor for controlling the operation of said mechanism, fluid pressure actuated means for controlling the effective operation of said governor, a remote controller for regulating the actuating pressure of said governor controlling means, and means for rendering said actuating mechanism operative or inoperative.

18. An apparatus of the character described, comprising a fluid delivery means and an actuating mechanism therefor, a governor for controlling the operation of said mechanism, fluid pressure actuated means for controlling the effective operation of said governor, and a remote controller for regulating the actuating pressure to said governor controlling means.

19. A device of the character described, comprising fluid delivery valve means, a pressure actuated motor for controlling the operation of said valve means, a relay valve for controlling the delivery of actuating pressure to said motor, a governor for controlling the operation of the relay valve, and means for connecting the relay valve to the motor controlled thereby, whereby the relay valve moves with the motor.

20. In a device of the character described, a fluid delivery valve, a pressure actuated motor for controlling the operation of said valve, a relay valve for controlling the delivery of actuating fluid to said motor, a governor for controlling the operation of the relay valve, a connection between the relay valve and the motor for varying the position of the relay valve during the operation of the motor, means located between the relay valve and the motor for rendering the valve effective or ineffective in delivering actuating fluid to the motor, and a remote controller for actuating said last mentioned means.

21. In an apparatus of the character described, a fluid delivery valve, an actuating motor therefor, a relay device for controlling the operation of said motor, a governor for controlling the operation of the relay device, and a remote control for the governor.

22. In a fluid impelled engine, the combination of a fluid delivery valve for proportioning the delivery of motive fluid to the engine, a motor for actuating said valve comprising a pressure actuated piston, a cylinder in which the piston is located, a relay for controlling the fluid pressure within the cylinder, a positive connection between the relay and the piston whereby the motion of the piston actuates the relay and thereby determines the extent of motion of the piston, and a valve located between the relay and the piston for rendering the relay effective or ineffective as the pressure controlling agent.

23. In a fluid impelled engine, the combination of a fluid delivery valve for proportioning the delivery of motive fluid to the engine, pressure responsive means for actuating said valve, a governor controlled relay for controlling the actuating pressure delivered to said means, and a valve between the relay and said means for rendering the relay effective or ineffective as the pressure controlling agent of said means.

24. In a fluid impelled engine, the combination of a fluid delivery valve for delivering and for proportioning the delivery of motive fluid to the engine, pressure responsive means for actuating said valve, a governor controlled relay for delivering actuating fluid to and for discharging it from said means, a valve between the relay and said means for rendering the relay effective or ineffective in controlling the operation of said means, and an emergency valve for delivering actuating fluid to and for controlling the operation of said means.

25. In a fluid impelled engine, the combination of fluid delivery means for proportioning the delivery of fluid to the engine, a cylinder and a coöperating pressure actuating plunger for actuating said means, a relay for controlling the pressure delivered to the cylinder, a selective mechanism interposed between the relay and the cylinder for rendering the relay effective or ineffective in controlling the operation of the piston, and an emergency valve communicating with said selective mechanism for controlling the operation of the piston when said relay is incapacitated.

26. In a fluid impelled engine, the combination of fluid delivery means for delivering and proportioning the delivery of fluid to the engine, a cylinder and a coöperating pressure actuated plunger for actuating said means, a relay for controlling the delivery of actuating fluid to and the discharge of actuating fluid from the cylinder, a selective mechanism interposed between the relay and the cylinder for rendering the relay effective or ineffective in controlling the operation of the piston, an emergency valve communicating with said selective mechanism and for controlling the delivery of actuating fluid to the cylinder which the relay is incapacitated, and a check valve between said emergency valve and said selective mechanism.

27. In a fluid impelled engine, the combination of a rotatable valve for proportioning the delivery of fluid to said engine, a pressure cylinder, a pressure responsive piston located in the cylinder for actuating the valve, means for proportioning the pressure delivered to the piston, a rack actuated by the piston, a gear for rotating the valve, and means actuated by the rack for actuating the gear.

28. In a fluid impelled engine, the combination of a rotatable valve for delivering and for proportioning the delivery of fluid to said engine, a pressure cylinder, a pressure responsive piston located within the cylinder, a relay for proportioning the actuating pressure delivered to the cylinder, a governor for actuating the relay, a connection between the piston and the relay whereby the relay moves in response to the motion of the piston, a rack actuated by the piston, a gear for controlling the rotatable valve, and means actuated by the rack for actuating the piston.

29. In combination, two separate fluid delivery valves, a separate pressure actuated device for actuating each valve, a separate governor controlled relay for controlling the operation of each device, and a manually controlled selective mechanism located between said device and said relay for rendering one relay effective and the other ineffective in controlling the operation of its corresponding device.

30. In combination, two separate fluid delivery valves, a separate pressure actuated device for actuating each valve, a relay valve for controlling the operation of each device, a governor, means for connecting both relay valves to said governor, and a selective mechanism between said relay valves and their respective devices for rendering one effective and the other ineffective in controlling the operation of its respective device.

31. In combination with a speed responsive governor, a controller comprising a casing inclosing a variable pressure chamber, and a uniform pressure chamber, and having an exhaust port and a pressure delivery port, coöperating pressure responsive and manually controlled means for controlling the delivery of pressure from the uniform pressure chamber to the variable pressure chamber, a valve for establishing communication between said fluid delivery port and said fluid exhaust port, or between said fluid delivery port and said uniform pressure chamber, a single operating lever for controlling said valve and said manually controlled means, and means responsive to the pressure delivered through said pressure delivery port for controlling the operation of the governor.

32. In combination with a speed responsive governor, a controller having regulable means for delivering a variable pressure to a pressure chamber forming a part of the controller, a manually controlled valve for establishing and cutting off communication between a pressure delivery port of the controller, and a chamber of substantially constant fluid pressure, a single lever for actuating said valve and said regulating means, and means communicating with said pressure delivery port for controlling the operation of the governor.

33. A fluid actuated motor having fluid delivery means, in combination with mechanisms for actuating said means, a speed responsive device driven by the motor for controlling the operation of said means, pressure actuated means for rendering one or the other of said first mentioned means operative in controlling the delivery of motive fluid to the motor, and a controller located at a distance from the motor for controlling the operation of said pressure actuated means.

34. In combination with a speed responsive governor, pressure actuated means for varying the effective operation of the governor, and a controller for varying the pressure delivered to said means, comprising a pressure chamber having a delivery port communicating with said means, and an inlet port, a pressure chest, communicating with a source of substantially constant pressure and with said inlet port and with an exhaust port, a valve responsive to variations of pressure within said pressure chamber for controlling communication between said inlet port, said chest and said exhaust port, and manually adjustable means for varying the effective operation of said valve.

35. In combination, a speed controlling governor, pressure actuated means for varying the operation of said governor and a pressure controller comprising a chamber provided with an outlet port communicating with said pressure actuated means, and an inlet port, an adjusting means provided with an opening communicating with said inlet port, a valve responsive to variations of pressure within said chamber for controlling the delivery of fluid through said opening, and means for moving said adjusting means relative to said valve to vary the pressure within said chamber.

In testimony whereof, I have hereunto subscribed my name this 22nd day of November, 1910.

HERBERT T. HERR.

Witnesses:
C. W. McGhee,
B. F. Funk.

in controlling the operation of its respective device.

31. In combination with a speed responsive governor, a controller comprising a casing inclosing a variable pressure chamber, and a uniform pressure chamber, and having an exhaust port and a pressure delivery port, coöperating pressure responsive and manually controlled means for controlling the delivery of pressure from the uniform pressure chamber to the variable pressure chamber, a valve for establishing communication between said fluid delivery port and said fluid exhaust port, or between said fluid delivery port and said uniform pressure chamber, a single operating lever for controlling said valve and said manually controlled means, and means responsive to the pressure delivered through said pressure delivery port for controlling the operation of the governor.

32. In combination with a speed responsive governor, a controller having regulable means for delivering a variable pressure to a pressure chamber forming a part of the controller, a manually controlled valve for establishing and cutting off communication between a pressure delivery port of the controller, and a chamber of substantially constant fluid pressure, a single lever for actuating said valve and said regulating means, and means communicating with said pressure delivery port for controlling the operation of the governor.

33. A fluid actuated motor having fluid delivery means, in combination with mechanisms for actuating said means, a speed responsive device driven by the motor for controlling the operation of said means, pressure actuated means for rendering one or the other of said first mentioned means operative in controlling the delivery of motive fluid to the motor, and a controller located at a distance from the motor for controlling the operation of said pressure actuated means.

34. In combination with a speed responsive governor, pressure actuated means for varying the effective operation of the governor, and a controller for varying the pressure delivered to said means, comprising a pressure chamber having a delivery port communicating with said means, and an inlet port, a pressure chest, communicating with a source of substantially constant pressure and with said inlet port and with an exhaust port, a valve responsive to variations of pressure within said pressure chamber for controlling communication between said inlet port, said chest and said exhaust port, and manually adjustable means for varying the effective operation of said valve.

35. In combination, a speed controlling governor, pressure actuated means for varying the operation of said governor and a pressure controller comprising a chamber provided with an outlet port communicating with said pressure actuated means, and an inlet port, an adjusting means provided with an opening communicating with said inlet port, a valve responsive to variations of pressure within said chamber for controlling the delivery of fluid through said opening, and means for moving said adjusting means relative to said valve to vary the pressure within said chamber.

In testimony whereof, I have hereunto subscribed my name this 22nd day of November, 1910.

HERBERT T. HERR.

Witnesses:
C. W. McGHEE,
B. F. FUNK.

---

It is hereby certified that in Letters Patent No. 1,185,096, granted May 30, 1916, upon the application of Herbert T. Herr, of Pittsburgh, Pennsylvania, for an improvement in "Motor Control," errors appear in the printed specification requiring correction as follows: Page 8, line 60, claim 25, for the word "actuating", first occurrence, read *actuated;* same page, line 84, claim 26, for the word "which" read *when;* and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 121—118.

It is hereby certified that in Letters Patent No. 1,185,096, granted May 30, 1916, upon the application of Herbert T. Herr, of Pittsburgh, Pennsylvania, for an improvement in "Motor Control," errors appear in the printed specification requiring correction as follows: Page 8, line 60, claim 25, for the word "actuating", first occurrence, read *actuated;* same page, line 84, claim 26, for the word "which" read *when;* and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 121—118.